(12) United States Patent
Choi et al.

(10) Patent No.: US 12,197,883 B2
(45) Date of Patent: Jan. 14, 2025

(54) METHOD AND SYSTEM FOR IMAGE TRANSLATION

(71) Applicant: NAVER CORPORATION, Seongnam-si (KR)

(72) Inventors: Chankyu Choi, Seongnam-si (KR); Seungjae Kim, Seongnam-si (KR); Juhyeok Mun, Seongnam-si (KR); Jeong Tae Lee, Seongnam-si (KR); Youngbin Ro, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 133 days.

(21) Appl. No.: 17/965,470

(22) Filed: Oct. 13, 2022

(65) Prior Publication Data
US 2023/0123129 A1 Apr. 20, 2023

(30) Foreign Application Priority Data
Oct. 14, 2021 (KR) .......................... 10-2021-0136416

(51) Int. Cl.
*G06F 40/58* (2020.01)
*G06T 11/00* (2006.01)
*G06V 20/20* (2022.01)

(52) U.S. Cl.
CPC .............. *G06F 40/58* (2020.01); *G06T 11/00* (2013.01); *G06V 20/20* (2022.01)

(58) Field of Classification Search
None
See application file for complete search history.

(56) References Cited

U.S. PATENT DOCUMENTS

| 7,143,351 | B1 | 11/2006 | Yamada | |
|---|---|---|---|---|
| 10,347,293 | B1* | 7/2019 | Skinner | G06F 3/1462 |
| 2009/0198486 | A1* | 8/2009 | Chang | G06F 40/58 704/2 |
| 2010/0068994 | A1* | 3/2010 | Maezawa | G06V 30/413 455/39 |
| 2010/0079667 | A1* | 4/2010 | Turetken | H04N 19/132 348/E7.003 |
| 2012/0092329 | A1 | 4/2012 | Koo et al. | |
| 2015/0146925 | A1* | 5/2015 | Son | G06V 20/00 382/103 |

(Continued)

FOREIGN PATENT DOCUMENTS

| JP | 200125022 | 1/2001 |
|---|---|---|
| JP | 2010074292 A | 4/2010 |

(Continued)

*Primary Examiner* — Sultana M Zalalee
(74) *Attorney, Agent, or Firm* — GREER BURNS & CRAIN, LTD.

(57) ABSTRACT

Provided is a method for augmented reality-based image translation performed by one or more processors, which includes storing a plurality of frames representing a video captured by a camera, extracting a first frame that satisfies a predetermined criterion from the stored plurality of frames, translating a first language sentence (or group of words) included in the first frame into a second language sentence (or group of words), determining a translation region including the second language sentence (or group of words) included in the first frame, and rendering the translation region in a second frame.

20 Claims, 11 Drawing Sheets

(56) References Cited

U.S. PATENT DOCUMENTS

| | | | | |
|---|---|---|---|---|
| 2019/0266432 A1* | 8/2019 | Lee | .................... | G06V 20/63 |
| 2022/0414963 A1* | 12/2022 | Hou | .................... | G06T 11/00 |
| 2023/0058296 A1* | 2/2023 | Tang | .................... | G06V 20/63 |

FOREIGN PATENT DOCUMENTS

| | | |
|---|---|---|
| JP | 2014-510958 A | 5/2014 |
| JP | 28519797 | 7/2016 |
| KR | 1020180059030 | 11/2016 |
| KR | 1020170082945 | 7/2017 |

\* cited by examiner

METHOD AND SYSTEM FOR IMAGE TRANSLATION

CROSS-REFERENCE TO RELATED APPLICATIONS

This application is based on and claims priority under 35 U.S.C § 119 to Korean Patent Application No. 10-2021-0136416, filed on Oct. 14, 2021, in the Korean Intellectual Property Office, the disclosure of which is incorporated herein by reference in its entirety.

BACKGROUND

1. Field

The present disclosure relates to a method and a system for image translation, and more specifically, to a method and a system for augmented reality-based image translation.

2. Description of Related Art

In recent years, translation applications that can be executed on mobile devices have been widely distributed. Accordingly, when a user encounters text in a foreign language whose meaning is unknown or difficult to interpret at their workplace or in daily life, the user can conveniently translate it through a mobile device he or she is carrying.

The existing translation application is configured such that, when the user directly inputs text in a language to be translated, the translation application translates the text by itself or obtains a translation result of the text from an external server and provides the result to the user. For this reason, when translating a language that is not digitally documented, it takes time for the user to directly input text, and in that process, a typo can occur in the text input process, in which case misinterpretation can occur.

To solve this problem, an image translation application is emerging, which captures an image of an object displayed in a foreign language with a camera, and analyzes the captured image to provide a translation service. However, since this image translation application captures and translates a static object fixed or arranged at a certain position, its application range may be limited. For example, if a user walking on a street wants to translate a signboard displayed in foreign language, or if an object moves, there is a problem in that it is difficult to use the image translation service.

SUMMARY

In order to solve one or more problems (e.g., the problems described above and/or other problems not explicitly described herein), the present disclosure provides a method for, a non-transitory computer-readable recording medium storing instructions for, and an apparatus (system) for augmented reality-based image translation.

The present disclosure may be implemented in a variety of ways, including as a method, as an apparatus (system), or as a non-transitory computer-readable recording medium storing instructions.

A method for augmented reality-based image translation is provided, in which the method may be performed by one or more processors and includes storing a plurality of frames representing a video captured by a camera, extracting a first frame that satisfies a predetermined criterion from the stored plurality of frames, translating a first language sentence included in the first frame into a second language sentence, determining a translation region including the second language sentence included in the first frame, and rendering the translation region in a second frame.

A non-transitory computer-readable recording medium storing instructions for executing a method for augmented reality-based image translation in a computer may be provided.

A system for augmented reality-based image translation may be provided, which may include a memory, and one or more processors connected to the memory and configured to execute one or more computer-readable programs included in the memory, in which the one or more programs may include instructions for storing a plurality of frames representing a video captured by a camera, extracting a first frame that satisfies a predetermined criterion from the stored plurality of frames, translating a first language sentence included in the first frame into a second language sentence, determining a translation region including the second language sentence included in the first frame, and rendering the translation region in a second frame.

According to some examples, while capturing a video through a camera, the user is provided with the result of translating a text in a specific language included in the video into another language and rendering the translated text for each frame, such that, the user is not required to capture the image of an object to be translated each time for the image translation thereof, and can view the translation result of the text included in the video together while viewing the video captured by the camera in real time.

According to some examples, if an angle of capturing the object to be translated included in the video captured through the camera is changed or if the position of the object is changed, the translation result for the object to be translated is rendered in the changed angle or position, and as a result, the user can view the translation result regardless of the change in the angle of capturing or position of the camera or the object to be translated.

According to some examples, the translation result of the object to be translated included in the video captured through the camera is rendered and displayed on the frame of the most recent video captured, and as a result, the user can view the translation result displayed in real time on the actual object to be translated in the augmented reality.

The effects of the present disclosure are not limited to the effects described above, and other effects not described herein can be clearly understood by those of ordinary skill in the art (referred to as an "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
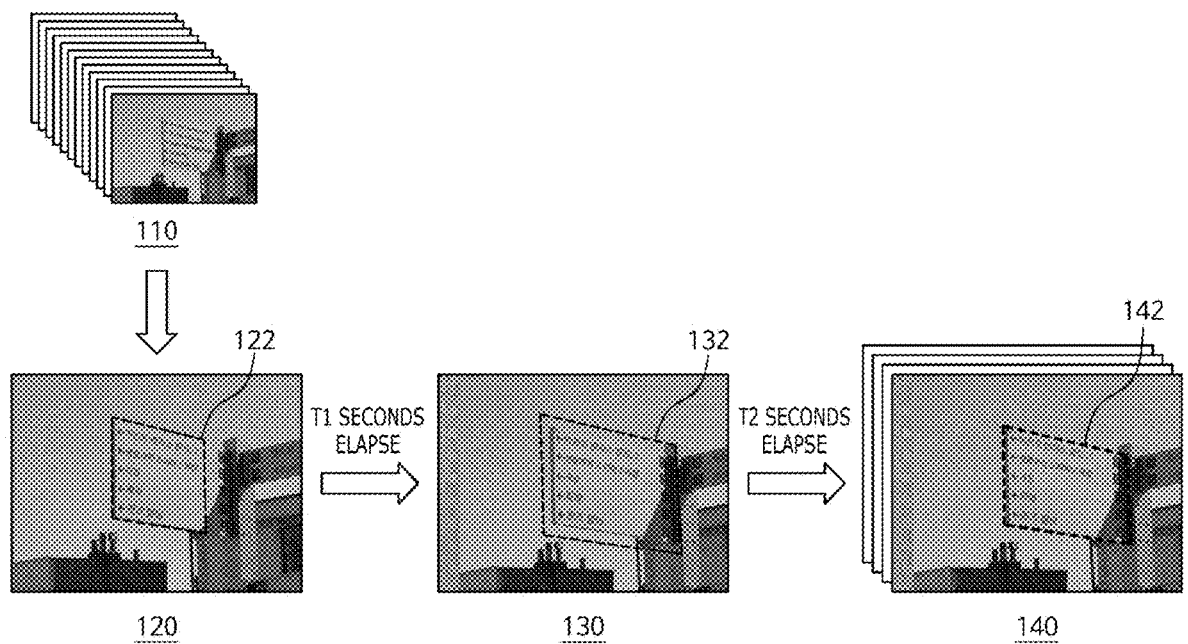
FIG. 1 illustrates an example in which a processor translates a language on an image based on augmented reality.

Hereinafter, examples for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various different forms, and the examples are merely provided to make the present disclosure complete, and to fully disclose the scope of the disclosure to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, but may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it is intended to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the terms "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media, such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but is not limited thereto. For example, the system may include one or more server devices. In another example, the system may include one or more cloud devices. In still another example, the system may include both a server device and a cloud device operated in conjunction with each other.

In the present disclosure, "rendering" may generally refer to superimposing a specific object two-dimensionally or three-dimensionally on each frame (or image) of a video and displaying the result. More specifically, rendering may refer to superimposing a translation result (or text) on an object to be translated included in each frame of the video. For example, rendering may include mapping or warping for mapping a region or box including the translated text to a corresponding region on the object to be translated included in each frame of the video, and superimposing and displaying the result of the mapping on the corresponding frame.

In the present disclosure, "augmented reality (AR)" may refer to outputting a two- or three-dimensionally rendered virtual object in a specific region of the corresponding video while outputting a video captured by the camera connected to the user terminal on the display of the user terminal. In the present disclosure, the result of translating text in a specific region included in the video captured by the camera may be provided to the user in real time through augmented reality.

FIG. 1 illustrates an example in which a processor translates a language on an image based on augmented reality. As illustrated, the processor may extract a first frame 120 from a plurality of frames 110 included in the video captured by the camera. In addition, the processor may translate a first language sentence (or other group of words) included in the first frame into a second language sentence (or group of words), and determine a translation region 122 including the second language sentence in the first frame. The processor may render the translation region in a region 132 for rendering on a second frame that is captured after a first time (e.g., T1 seconds) elapses. The first time may be equal to or greater than the time taken for the first language sentence included in the translation region 122 to be translated into the second language sentence after the first frame 120 is captured. At this time, the processor may use a feature transformation model to map the translation region 122 included in the first frame 120 to the region 132 for rendering included in a second frame 130. In addition, in order to translate in real time the first language included in the video captured by the camera into the second language, and to display the translated result on the display, the processor may determine, using the feature transformation model, a region 142 for rendering to be included in each of a plurality of frames 140 consecutive to the second frame 130, wherein the region 142 includes the translation region with the second language sentence rendered therein. The processor may render the translation region in each region 142 for rendering included in each of the plurality of frames 140.

In order to extract the first frame 120 from the plurality of frames 110 included in the video captured by the camera, the processor may store a plurality of frames included in the video captured by the camera in a buffer, and determine and extract a frame suitable for image translation from among the plurality of stored frames. The frame suitable for image translation may be a frame that includes at least a certain ratio of text to be translated, or a frame that includes text to be translated having enough information to derive an accurate translation result. For example, the frame suitable for image translation may be determined in consideration of the sharpness of an object or text included in the frame, the presence or absence of such an object or text, or an area ratio of the text portion included in the frame to non-text portion, the brightness of the frame, and/or the blurriness of the frame.

The processor may translate the first language sentence included in the extracted first frame into the second language sentence. For example, the processor may translate the first language sentence included in the first frame into the second language sentence by using an artificial neural network-based character recognition algorithm. According to another example, in order to translate the first language sentence, the processor may transmit the first frame to an external device and receive a second language sentence translated by the external device or a frame including the second language sentence.

In order to determine the translation region 122 in the first frame 120 that includes the second language sentence, the processor may extract text to be translated included in the first frame and features around the same. For example, after performing preprocessing including noise removal, binarization, segmentation, layout analysis, and the like on the first frame 120, the processor may extract the features including the contour of each character of the text. The processor may determine a region defined by connecting the extracted features to be the translation region 122.

The processor may render the translation region 122 including the second language sentence converted from the first language sentence in the second frame 130. To this end, the processor may determine the region 132 for rendering included in the second frame through the feature transformation model. The feature transformation model may calculate a transformation matrix for determining the features of the second frame 130 based on the features extracted from the first frame 120 including the translation region 122, and determine the region 132 for rendering on the second frame 130 based on the features of the second frame 130 using the calculated transformation matrix. The processor may render the translation region 122 including the second language sentence in the region 132 for rendering on the second frame 130.

Meanwhile, if the second frame 130 does not satisfy a predetermined criterion compared to the first frame 120, the processor may not render the translation region 122. For example, if the time interval T1 between the first frame 120 and the second frame 130 exceeds a predetermined time interval, the processor may start a new translation cycle without rendering the translation region 122. In another example, if a difference in motion between the first frame 120 and the second frame 130 exceeds a predetermined difference, a new translation cycle may be started.

In order to translate the first language sentence included in the video captured by the camera into the second language sentence in real time, the processor may determine, using the feature transformation model, the region 142 for rendering included in each of the plurality of frames 140 consecutive to the second frame 130 including the translation region 122 including the second language sentence rendered therein. The translation region 122 may be rendered so as to correspond to each region 142 for rendering included in each of the plurality of frames 140.

With the configuration described above, the user can view a video input/captured by the camera in real time together with a result of translating the first language sentence included in that video into the second language sentence, without having to capture an image of the object to be translated with the camera for the image translation thereof.

Figure 2:
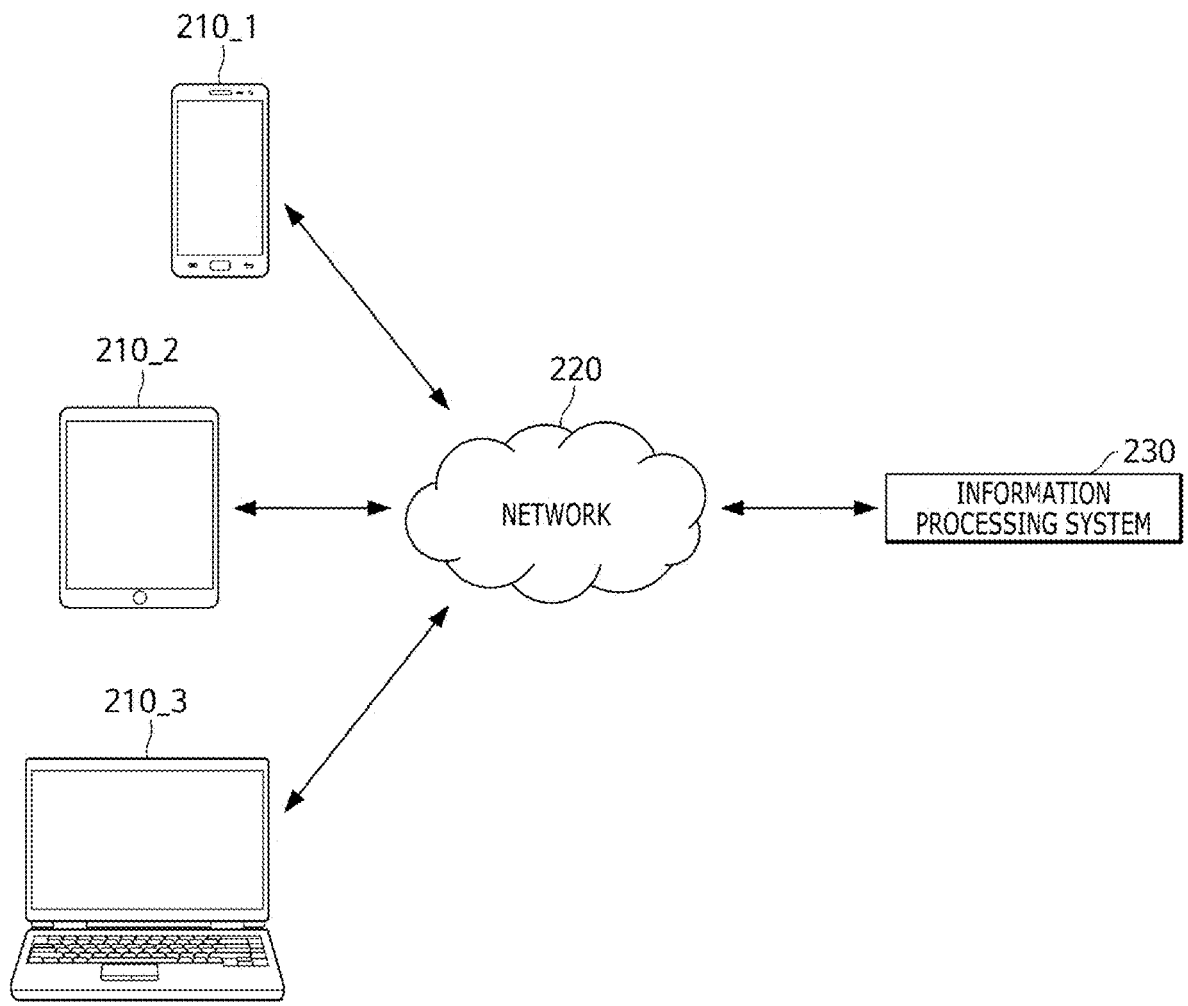
FIG. 2 schematically illustrates a configuration in which an information processing system is communicatively connected to a plurality of user terminals to translate a first language included in a captured video into a second language based on augmented reality.

FIG. 2 schematically illustrates a configuration in which an information processing system 230 is communicatively connected to a plurality of user terminals 210_1, 210_2, and 210_3 to translate the first language included in the captured video into the second language based on augmented reality. The information processing system 230 may include a system capable of providing augmented reality-based image translation to the plurality of user terminals 210_1, 210_2, and 210_3 through a network 220. The information processing system 230 may include one or more server devices and/or databases, or one or more distributed computing devices and/or distributed databases based on cloud computing services that can store, provide and execute computer-executable programs (e.g., downloadable applications) and data related to the augmented reality-based image translation. The service for augmented reality-based image translation provided by the information processing system 230 may be provided to the user through an augmented reality-based image translation application installed in each of the plurality of user terminals 210_1, 210_2, and 210_3.

The plurality of user terminals 210_1, 210_2, and 210_3 may communicate with the information processing system 230 through the network 220. The network 220 may be configured to enable communication between a plurality of user terminals 210 and the information processing system 230. The network 220 may be configured as a wired network 220 such as Ethernet, a wired home network (Power Line Communication), a telephone line communication device and RS-serial communication, a wireless network 220 such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but aspects are not limited thereto. For example, the network 220 may include any one or more of a variety of networks including a personal area network (PAN), a local area network (LAN), a campus area network (CAN), a metropolitan area network (MAN), a wide area network (WAN), a broadband network (BBN), the Internet, and the like. In addition, the network 220 may include any one or more types of different network topologies including a bus network, a star network, a ring network, a mesh network, a star-bus network, a tree or hierarchical network, and the like, but the network is not limited thereto.

In FIG. 2, a mobile phone terminal 210_1, a tablet terminal 210_2, and a PC terminal 210_3 are illustrated as the examples of the user terminals, but aspects are not limited thereto, and the user terminals 210_1, 210_2, and 210_3 may be any computing device that is capable of wired and/or wireless communication and that can be installed with the augmented reality-based image translation application and execute the same. For example, the user terminal may include a smartphone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, while FIG. 2 illustrates three user terminals 210_1, 210_2, and 210_3 in communication with the information processing system 230 through the network 220, the aspects are not limited thereto, and accordingly, a different number of the user terminals 210_1, 210_2, and 210_3 may be configured to be in communication with the information processing system 230 through the network 220.

The user terminals 210_1, 210_2, and 210_3 with the augmented reality-based image translation application operating thereon may perform image translation on a video captured by the camera (not illustrated) or a frame (or image) extracted from the video, render the result of image translation to the video and provide the result. Specifically, the user terminals 210_1, 210_2, and 210_3 may extract a frame suitable for image translation from a video captured by the camera and stored in the buffer, perform image translation for the frame, render the translation result in one or more frames of the video currently stored in the buffer, and output the result through a display.

According to another example, the user terminals 210_1, 210_2, and 210_3 may transmit the video captured by the camera or the frame (or image) extracted from the video to the information processing system 230 through the network 220. The information processing system 230 may perform image translation on the received video or a frame extracted from the video, and transmit the result of the image translation to the user terminals 210_1, 210_2, and 210_3. The user terminals 210_1, 210_2, and 210_3 that received the result of image translation may render the translation result in one or more frames of the video currently stored in the buffer, and output the result through the display.

Figure 3:
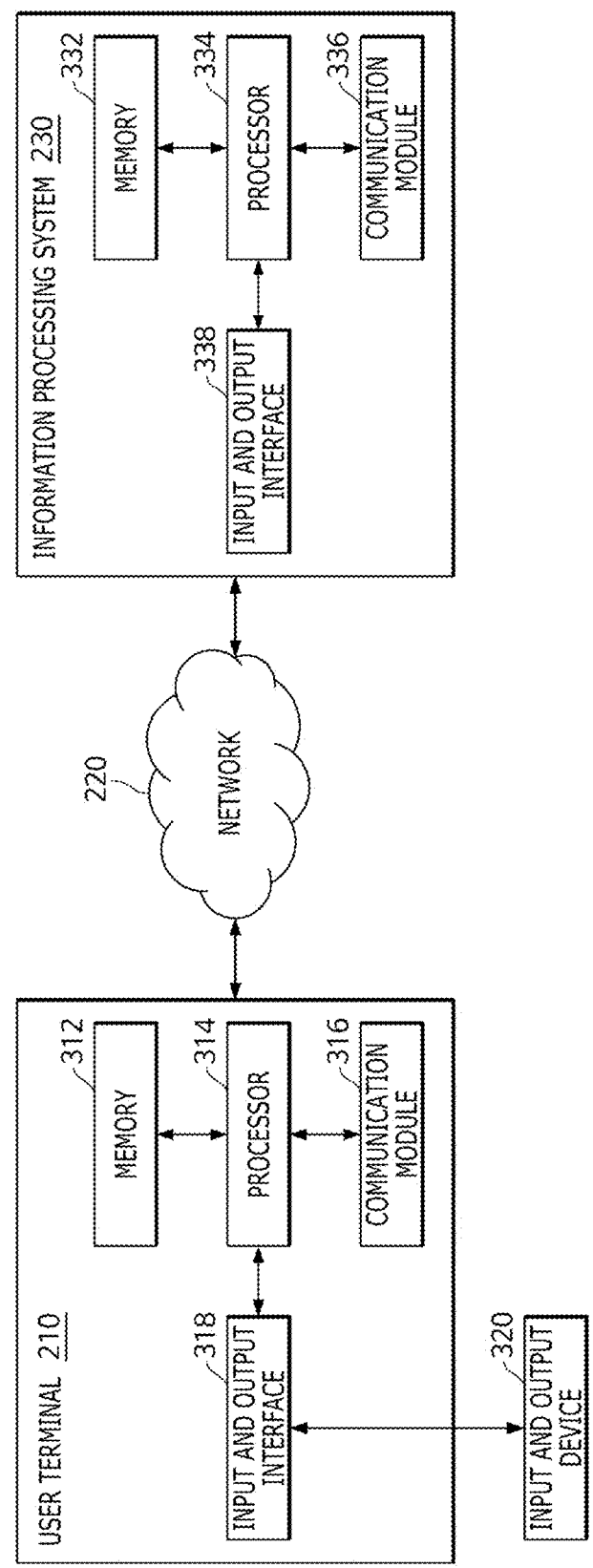
FIG. 3 is a block diagram of an internal configuration of the user terminal and the information processing system.

FIG. 3 is a block diagram of the internal configurations of the user terminal 210 and the information processing system 230. The user terminal 210 may refer to any computing device that is capable of executing the augmented reality-based image translation application, and that is also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using respective communication modules 316 and 336. In addition, an input and output device 320 may be configured to input information and/or data to the user terminal 210 or output information and/or data generated from the user terminal 210 through the input and output interface 318.

The memories 312 and 332 may include any type of non-transitory computer-readable recording medium. The memories 312 and 332 may include a permanent mass storage device such as a random access memory (RAM), a read only memory (ROM), a disk drive, a solid state drive (SSD), a flash memory, and so on. As another example, a non-destructive mass storage device such as a ROM, a SSD, a flash memory, a disk drive, and so on, may be included in the user terminal 210 or the information processing system 230 as a separate permanent storage device that is distinct from the memory. In addition, an operating system and at least one program code (e.g., a code for the augmented reality-based image translation application, and the like installed and driven in the user terminal 210) may be stored in the memories 312 and 332.

These software components may be loaded from a computer-readable recording medium that is separate from the memories 312 and 332. Such a separate computer-readable recording medium may include a recording medium that is directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than through the computer-readable recording medium. For example, at least one program may be loaded into the memories 312 and 332 based on a computer program (for example, an application that provides a service for augmented reality-based image translation) installed by the files provided by the developers or by a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or from the communication modules 316 and 336. For example, the processors 314 and 334 may be configured to execute the received instructions according to a program code stored in a recording device, such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system, image translation system or the like). For example, a request (for example, a request for image translation) generated by the processor 314 of the user terminal 210 according to the program code stored in the recording device such as the memory 312 and the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220. For example, the user terminal 210 may receive, from the information processing system 230 and through the communication module 316, the video/image having the text translated by the image translation or the text rendered therein.

The input and output interface 318 may be a means for interfacing with the input and output device 320. As an example, the input device may include a device such as a camera including an image sensor, a keyboard, a microphone, a mouse, and so on, and the output device may include a device such as a display, a speaker, a haptic feedback device, and so on. As another example, the input and output interface 318 may be a means for interfacing with a device that integrates both inputting and outputting configurations or functions, such as a touch screen or the like. For example, if the processor 314 of the user terminal 210 processes the instructions of the computer program loaded in the memory 312, a service screen, which is configured with the information and/or data provided by the information processing system 230 or other user terminals 210, may be displayed on the display through the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as components that are configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210.

The processor 314 of the user terminal 210 may be configured to operate an augmented reality-based image translation application or a web browser application that provides a service for augmented reality-based image translation. A program code associated with the above application may be loaded into the memory 312 of the user terminal 210. While the application is running, the processor 314 of the user terminal 210 may receive information and/or data provided from the input and output device 320 through the input and output interface 318, or it may receive information and/or data from the information processing system 230 through the communication module 316, and it can then process the received information and/or data and store it in the memory 312. In addition, such information and/or data may be provided to the information processing system 230 through the communication module 316.

While the augmented reality-based image translation application is running, the processor 314 may receive texts, images, and the like, which may be inputted or selected through the input device 320 (such as a touch screen, a keyboard, and the like) connected to the input and output interface 318, and store the received texts, and/or images in the memory 312 or provide them to the information processing system 230 through the communication module 316 and the network 220. For example, the processor 314 may receive information on the request for image translation, and the like, through an input device such as a touch screen, a keyboard, or the like. Accordingly, the received request and/or information may be provided to the information processing system 230 through the communication module 316 and the network 220.

The processor 314 of the user terminal 210 may be configured to manage, process, and/or store the information and/or data received from the input and output device 320, from another user terminal, from the information processing system 230 and/or from a plurality of external systems. The information and/or data processed by the processor 314 may be provided to the information processing system 230 via the communication module 316 and the network 220. The processor 314 of the user terminal 210 may transmit the information and/or data to the input and output device 320 through the input and output interface 318 to output the same. For example, the processor 314 may display the received information and/or data on a screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 via the communication module 336 and the network 220. For example, while the augmented reality-based image translation application is operated by the user terminal 210, the processor 334 may receive an image and/or a request for image translation from the user terminal 210 through the communication module 336, and store the received image in the memory 332 or execute image translation on the received image. In addition, the processor 334 may store the result of image translation in the memory 332 again or provide it to the user terminal 210 through the communication module 336 and the network 220. While FIG. 3 illustrates the information processing system 230 as a single system, aspects are not limited thereto, and the information processing system 230 may consist of a plurality of systems and servers for providing various services association with the service for augmented reality-based image translation. For example, the information processing system 230 may include a separate server including an image translation model, and the like.

Figure 4:
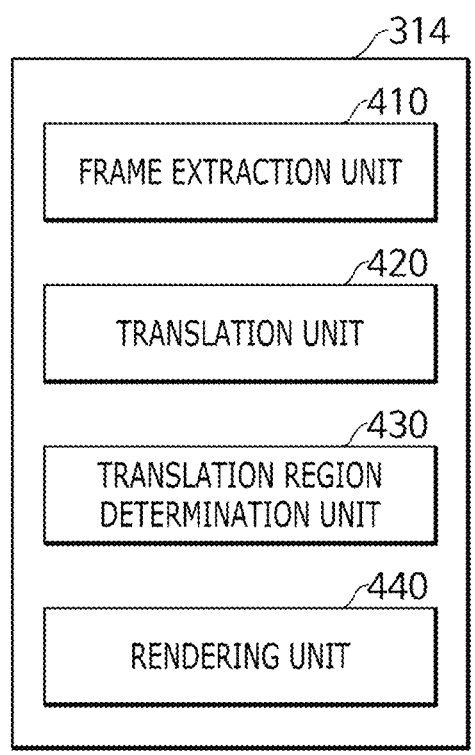
FIG. 4 is a block diagram of an internal configuration of the processor.

FIG. 4 is a block diagram of an internal configuration of the processor 314. As illustrated, the processor 314 may include a frame extraction unit 410, a translation unit 420, a translation region determination unit 430, and a rendering unit 440. While FIG. 4 illustrates that the processor 314 includes a single processor, aspects are not limited thereto, and the processor 314 may include a plurality of processors.

The frame extraction unit 410 may store a plurality of frames representing a video captured by the camera. The camera may refer to an image capturing device attachable to and detachable from the user terminal, or an image capturing device built into the user terminal, but aspects are not limited thereto. A video captured by the camera may be output through a display device installed in the user terminal. At the same time, a plurality of frames of the video may be stored in a buffer that is either set in the memory of the user terminal or that is part of a separate storage device. The number of the plurality of frames stored in the buffer may be determined in advance. For example, 10 video frames may be stored in the buffer.

In addition, the frame extraction unit 410 may extract a frame that satisfies a predetermined criterion from the plurality of stored frames. The predetermined criterion may be a criterion for selecting a frame suitable for image translation, such as a criterion that at least a certain ratio of text to be translated is included in the frame, or that the text to be translated included in the frame has enough information to derive an accurate translation result. For example, the frame extraction unit 410 may extract a frame that satisfies a predetermined brightness or sharpness from among the plurality of stored frames. In another example, the frame extraction unit 410 may extract, from among the plurality of stored frames, a frame that includes more than a predetermined number of characters or edges therein, or a frame that is applied with at least a certain degree of a specific graphic processing such as a blurring effect that blurs all or part of the frame, or the like.

The translation unit 420 may translate a sentence (or other group of words) to be translated (hereinafter, "first language sentence") included in the frame (hereinafter, "first frame") extracted by the frame extraction unit 410 into a translated sentence, or group of words, (hereinafter, "second language sentence"). For example, the translation unit 420 may use an artificial neural network-based character recognition algorithm to translate the first language sentence into the second language sentence. In another example, in order to translate the first language sentence, the translation unit 420 may transmit the first frame to the external device and receive the second language sentence translated by the external device or a frame including the second language sentence. The translation unit 420 may utilize an image translation application programming interface (API) to perform image translation with the external device. The image translation API may input a frame including the sentence to be translated and output the translated sentence or a frame including the translated sentence.

The translation region determination unit 430 may determine a translation region in the first frame including the second language sentence. The translation region determination unit 430 may extract features from around the first language sentence translated into the second language sentence in the first frame and connect the features to determine a translation region. For example, after performing preprocessing including noise removal, binarization, segmentation, layout analysis, and the like on the first frame, the translation region determination unit 430 may extract the features including the contour of each character of the text included in the first frame. The translation region determination unit 430 may determine the region defined by connecting the extracted features to be the translation region.

The rendering unit 440 may render the translation region determined by the translation region determination unit 430 in another frame (hereinafter, referred to as a "second frame") of the video currently stored in the buffer. The second frame may be a frame captured after the time when the first frame was extracted. Specifically, the second frame may refer to a frame representing a portion of the video captured by the camera or stored in the buffer at a time when the first language sentence is translated into the second language sentence by the translation unit 420.

The rendering unit 440 may determine whether or not to render the translation region in the second frame. If the first and second frames satisfy a predetermined criterion, the rendering unit 440 may render the translation region in the second frame. For example, if the time interval between the first and second frames exceeds a predetermined time interval, the rendering unit 440 may determine not to render the translation region in the second frame. In another example, if a difference in motion between the first and second frames is greater than a predetermined difference in motion, the rendering unit 440 may determine not to render the translation region in the second frame. This is because, if a certain time elapses after the video including the first frame is captured, or if there is a large change in the shape or position of one or more objects including the translation region between the first and second frames including the second language sentence, the sentence to be translated included in the corresponding frames may be changed, or it may be difficult to match the translation region of the first frame including the second language sentence to the region for rendering of the second frame.

The rendering unit 440 may determine a region for rendering so as to render the translation region in the second frame. The rendering unit 440 may determine the region for rendering on the second frame by using a feature transformation model based on the features of the translation region extracted/determined by the translation region determination unit 430. The feature transformation model may include a transformation matrix or a homography matrix that matches the translation region on the first frame including the second language sentence to the region for rendering on the second frame.

The rendering unit 440 may determine whether or not to render the translation region in a plurality of frames (hereinafter, referred to as "third frame") consecutive to the second frame having the translation region rendered therein and/or whether or not to maintain the region for rendering in the third frame. To this end, the rendering unit 440 may determine a time interval between the second and third frames, and determine whether or not to maintain the region for rendering based on the determined time interval.

For example, if the time interval between the second and third frames is less than the predetermined time interval, the rendering unit 440 may maintain the region for rendering determined on the second frame also on the third frame. The rendering unit 440 may render the translation region in the third frame including the maintained region for rendering. The third frame may be one of a plurality of consecutive frames following the second frame. In other words, the third frame may refer to a frame representing at least a portion of the video captured by the camera or stored in the buffer at the time of rendering the translation region.

In another example, if the time interval between the second and third frames is equal to or greater than a predetermined time interval, the frame extraction unit 410 may store a plurality of frames captured by the camera in the buffer again, extract a frame that meets a predetermined criterion from the stored plurality of frames again, and execute a subsequent procedure including the image translation, and the like.

The rendering unit 440 may determine a feature transformation model (or transformation matrix) or a matching algorithm for determining a region for rendering, based on a time interval between the first and second frames.

For example, if the time interval between the frames is long, a feature transformation model for determining a region for rendering may be determined using a feature matching algorithm. The feature matching algorithm may extract keypoints representing the text and descriptors representing the features around the text from each of the first and second frames (or from the second and third frames) including the second language sentence, and calculate a similarity between all the keypoints and the features to perform matching. In addition, the feature matching algorithm may estimate a transformation matrix between the matched keypoints or the features, and use the estimated transformation matrix to warp the translation region of the first frame including the second language sentence into the region for rendering of the second frame.

In another example, if the time interval between the frames is short, a feature transformation model for determining a region for rendering may be determined using a feature tracking algorithm. The feature tracking algorithm may extract keypoints representing the text from the first frame (or second frame) including the second language sentence, and track a path the keypoints moved in the second frame (or the third frame) using optical flow technology. In addition, the feature tracking algorithm may estimate a transformation matrix between the keypoints on the first frame and the keypoints on the second frame including the second language sentence, and use the estimated transformation matrix to wrap the translation region of the first frame including the second language sentence into the region for rendering of the second frame.

With the configuration described above, the translation result of the object to be translated included in the video captured through the camera is rendered and displayed on the frame of the most recent video captured, so that the user can view the translation result displayed in real time on the actual object to be translated in the augmented reality.

Figure 5:
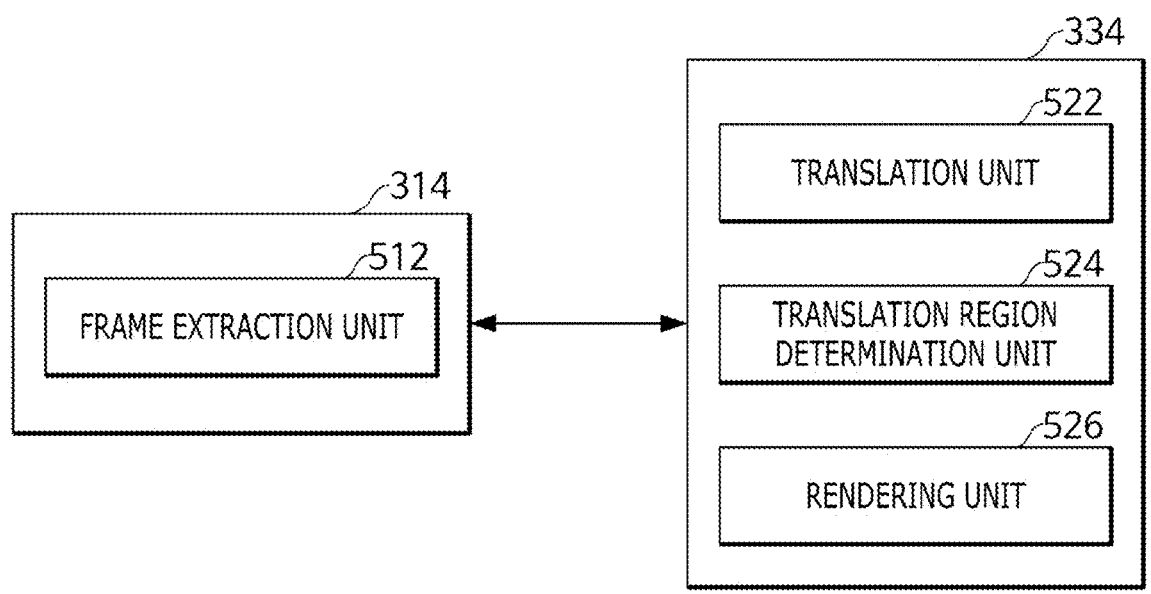
FIG. 5 is a block diagram of an internal configuration of a processor of the user terminal and a processor of the information processing system.

FIG. 5 is a block diagram of an internal configuration of the processor 314 of the user terminal and the processor 334 of the information processing system.

As illustrated, the processor 314 of the user terminal may include a frame extraction unit 512. In addition, the processor 334 of the information processing system may include a translation unit 522, a translation region determination unit 524, and a rendering unit 526. FIG. 5 illustrates the processor of the user terminal and the processor of the information processing system each as a single processor, but aspects are not limited thereto, and each may comprise a plurality of processors.

The frame extraction unit 512 in the processor 314 of the user terminal may extract a first frame that is suitable for image translation from among a plurality of frames of the video captured by the camera and stored. The processor 314 may transmit an image corresponding to the first frame to the information processing system, and receive a second frame including a second language sentence that is a translation result of the first language sentence included in the first frame from the information processing system. That is, the translation unit 522 of the processor 334 of the information processing system may execute image translation for the first frame, and the rendering unit 526 may render the translation region determined by the translation region determination unit 524 in the region for rendering on the second frame and transmit the result to the user terminal. Upon receiving the second frame, the processor 314 may output the received second frame through the display of the user terminal.

According to another example, the processor 314 of the user terminal may include the frame extraction unit 512, the translation region determination unit 524, and the rendering unit 526, and the processor 334 of the information processing system may include the translation unit 522. The frame extraction unit 512 of the processor 314 may extract a first frame suitable for image translation from among a plurality of frames of the video captured by the camera and stored, and transmit the extracted first frame to the information processing system. In the processor 334 of the information processing system that received the first frame, the translation unit 522 may execute image translation for the first language sentence on the first frame, and transmit the translation result to the user terminal. In the processor 314 of the user terminal that received the result of image translation, the translation region determination unit 524 may perform preprocessing on the first frame to determine a translation region including the second language sentence. In addition, the rendering unit 526 may render the translation region in the region for rendering on the second frame and output the result through the display of the user terminal.

As described above in various examples, the frame extraction unit 512, the translation unit 522, the translation region determination unit 524, and the rendering unit 526 may be appropriately installed in a distributed manner in each of the user terminal and the information processing system according to the arrangement of computing resources of the entire system including the user terminal and the information processing system. In addition, the processor 314 of the user terminal may determine whether to perform image translation of the first language sentence included in the first frame and/or rendering of the translation region in the user terminal or in the external device (or information processing system). That is, the processor 314 of the user terminal may determine, in cooperation with the processor 334 of the information processing system, which one will perform the translation and/or rendering, in consideration of a required translation quality, translation speed, and resolution of a frame for image translation.

Figure 6:
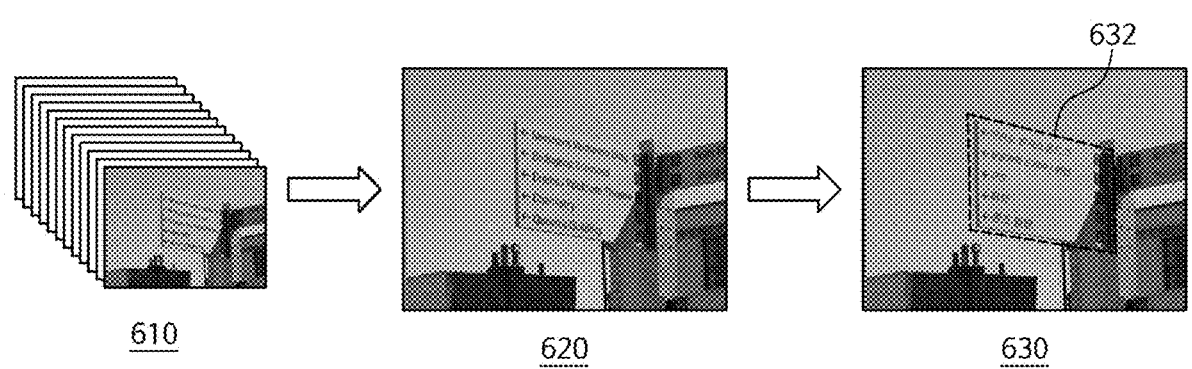
FIG. 6 illustrates an example of extracting a frame from a captured video, translating the same, and determining a translation region including the translated sentence in the frame.

FIG. 6 illustrates an example of extracting a frame from a captured video, translating the same, and determining a translation region including the translated sentence in the frame.

As illustrated, the processor may store a plurality of frames of the video captured by the camera, extract one frame suitable for image translation, translate the first language sentence (or group of words) included in the extracted frame into the second language sentence (or group of words), and determine a translation region including the translated sentence in the frame.

Specifically, in a first operation 610, the processor may store in a buffer a plurality of frames of the video captured by the camera. The number of the plurality of frames stored in the buffer may be determined in advance. For example, as illustrated, 10 frames may be stored in the buffer set in the memory of the user terminal or the like.

In a second operation 620, the processor may extract a frame that satisfies a predetermined criterion from the plurality of stored frames. The predetermined criterion may include the brightness or sharpness of the frame, the number of characters included in the frame, the number of edges, or whether or not graphic processing such as a blurring effect for blurring all or part of the frame is applied, and the like. For example, as illustrated, from a plurality of frames stored in the buffer, the processor may extract one frame that includes text, has no blurring effect, and has the highest sharpness.

In a third operation 630, the processor may perform image translation of the first language sentence included in the extracted frame into the second language sentence, and determine a translation region 632 including the second language sentence. For example, as illustrated, the processor may extract English text included in the extracted frame and features around the text and connect them to determine the translation region 632. Although FIG. 6 illustrates that translation region 632 includes a plurality of rectangular regions, aspects of the invention are not limited thereto, and the invention may also include one or more regions defined by one or more points, one or more regions defined by closed curves, or one or more polygonal regions.

Figure 7:
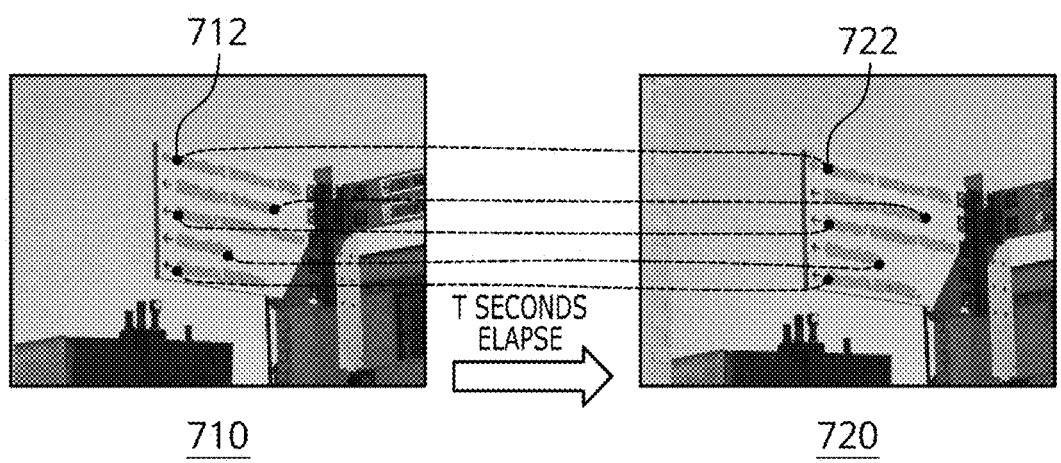
FIG. 7 illustrates an example of determining a region for rendering in a second frame based on a first frame.

FIG. 7 illustrates an example of determining a region for rendering in a second frame based on a first frame.

As illustrated, the processor may determine the region for rendering including keypoints 722 in the second frame by using the feature tracking algorithm, based on keypoints 712 of the region for translation including the text in the first language in the first frame or of the translation region including the text in the second language after translation.

Specifically, in a first operation 710, the keypoints 712 of the text of the first or second language included in the first frame may be extracted. In addition, in a second operation 720, the movement of the keypoints 712 of the first frame may be tracked and matched to the keypoints 722 of the text included in the second frame to determine a region for rendering. A feature transformation model defining a transformation relationship between the keypoints 712 and 722 may be determined using a feature tracking algorithm. For example, the feature transformation model may track and match the keypoints 722 in the second frame 720 captured after a predetermined time (e.g., t seconds) elapses from the first frame by applying optical flow technology to the keypoints 712 extracted from the first frame 710. A region for rendering in the second frame may be determined by estimating a transformation matrix between the extracted keypoints 712 and the tracked keypoints 722.

Estimation of a transformation matrix using the feature tracking algorithm may be performed if a predetermined criterion is satisfied. For example, if the time between the first and second frames is short or if the difference in motion between the frames is small, the region for rendering may be determined using the feature tracking algorithm. This is because, in this case, since the similarity between frames is high, it is efficient to use the feature tracking algorithm to simply and quickly determine the region for rendering to render the result of image translation.

While FIG. 7 illustrates an example of determining the region for rendering in the second frame based on the first frame, aspects are not limited thereto, and the example described above may also be applied to determining a region for rendering in a plurality of frames (e.g., third frame) consecutive to the second frame. In addition, one of various keypoint detection techniques including a FAST detector, a Harris corner detector, and the like may be used for the extraction of keypoints, and the optical flow technology may include any one of various optical flow tracking technologies such as robust local optical flow (RLOF), Lucas-kanade optical flow, and the like. In addition, while it is described above that optical flow technology is used for matching features between frames, aspects are not limited thereto, and other matching techniques such as kernel-based tracking, silhouette-based tracking, and the like may be applied.

Figure 8:
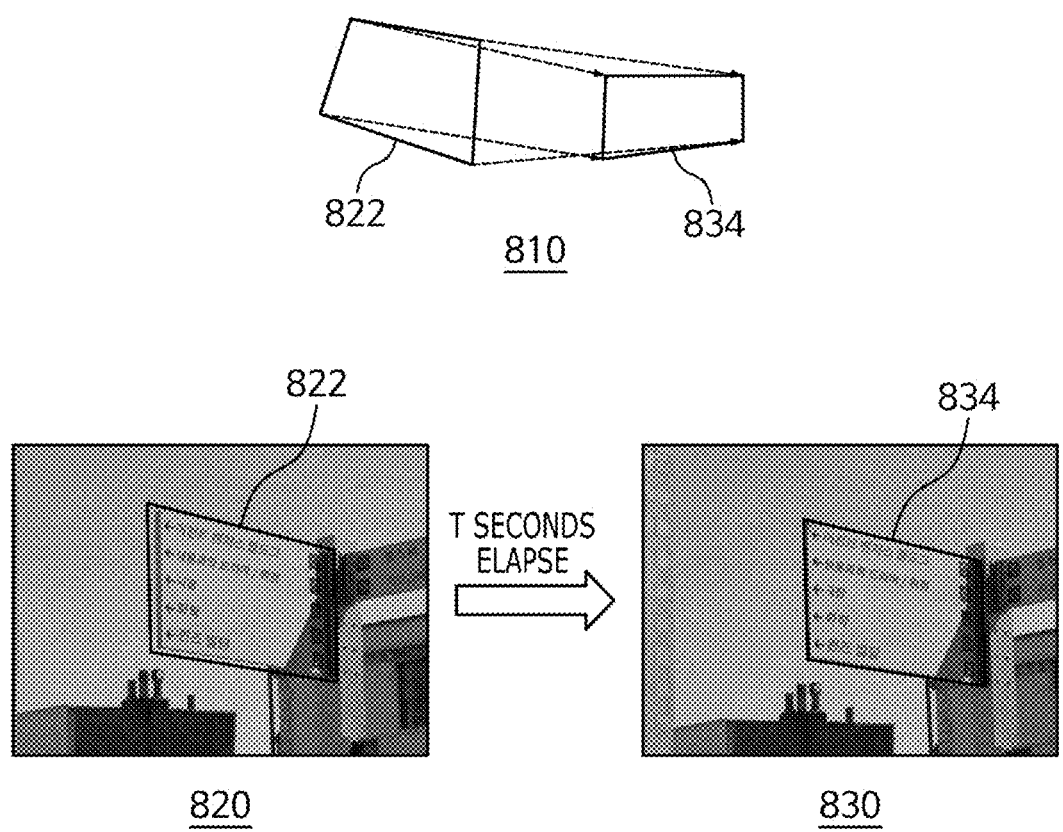
FIG. 8 illustrates an example of determining a region for rendering in a second frame based on a first frame and performing rendering.

FIG. 8 illustrates an example of determining a region for rendering in a second frame based on a first frame and performing rendering.

As illustrated, the processor may estimate a homography matrix 810 based on the region for translation or translation region 822 in the first frame to determine a region 834 for rendering in the second frame, thereby rendering the result of image translation.

Specifically, in a first operation 820, the processor may determine the translation region 822 based on the keypoints representing the text in the first frame and the features around the text. In addition, in a second operation 830, the processor may extract the keypoints of the text and the features around the text from the second frame that is captured and stored after a predetermined time (t seconds) elapses from the first frame, to determine the region 834 for rendering. The processor may perform matching between the keypoints and the features of the first and second frames based on the similarity thereof, and estimate the homography matrix 810 representing a transformation relationship between the matched keypoints and features. In addition, the processor may wrap the translation region 822 of the first frame into a region 834 for rendering on the second frame by using the homography matrix 810.

While FIG. 8 illustrates an example of determining the region for rendering in the second frame based on the first frame, aspects are not limited thereto, and the example described above may also be applied to determining a region for rendering in a plurality of frames (e.g., third frame) consecutive to the second frame. In addition, one of various keypoint detection techniques including a FAST detector, a Harris corner detector, and the like may be used for the extraction of features, and one of various feature extraction techniques such as BEBLID descriptor extractor, SURF descriptor extractor, and the like may be used for the extraction of keypoints. In addition, matching between keypoints and features may be performed using a Brute-Force Matcher, for example.

Figure 9:
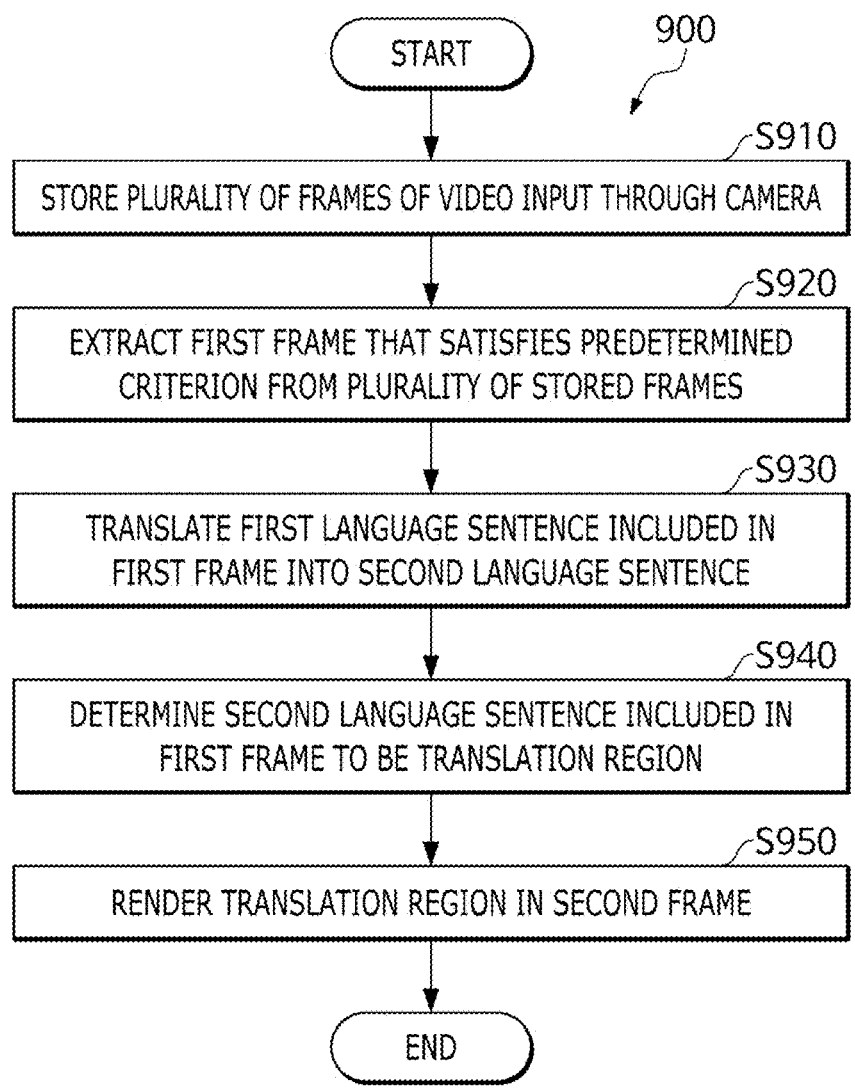
FIG. 9 is a flowchart illustrating a method for augmented reality-based image translation.

FIG. 9 is a flowchart illustrating an example of a method 900 for augmented reality-based image translation. The method 900 for augmented reality-based image translation may be performed by a processor (e.g., one or more processors of the information processing system or the user terminal).

As illustrated, the method 900 may be initiated at S910 by the processor storing in a buffer a plurality of frames representing a video captured by the camera. The processor may extract a first frame that satisfies a predetermined criterion from the plurality of stored frames, at S920. The predetermined criterion may include a predetermined number of words or groups of words included in the plurality of frames, a predetermined number of edges, or whether or not graphic processing is applied. According to another example, the predetermined criterion may include a predetermined brightness or a predetermined sharpness of the plurality of frames. For example, the processor may extract, from among the plurality of frames stored in the buffer, one frame that satisfies the criterion, such as a frame that includes text in at least a certain ratio of a region, a frame that is applied with a certain degree of graphic processing such as blurring or the like or less, and/or a frame that has at least a certain degree of sharpness, and the like.

The processor may translate the first language sentence (or group of words) included in the extracted first frame into the second language sentence (or group of words), at S930. An external device may be used for translating the first language sentence into the second language sentence. For example, the processor may transmit the first frame to the external device and receive from the external device the first frame including the second language sentence that is translated from the first language sentence included in the first frame.

The processor may determine a translation region including the second language sentence included in the first frame, at S940. For example, the processor may extract the keypoints of the text included in the translated sentence (that is, the second language sentence) in the first frame and the features around the text, and connect the keypoints and/or features to determine a translation region.

The processor may render the translation region in the second frame, at S950. The processor may determine a region for rendering on the second frame to render the translation region in the second frame. The processor may use a feature transformation model to determine a region for rendering on the second frame based on the determined features of the translation region, and render the translation region in the determined region for rendering. The feature transformation model may include a homography matrix that matches the translation region on the first frame including the second language sentence to the region for rendering on the second frame.

The flowchart illustrated in FIG. 9 and the above description are merely examples, and may be implemented differently in some other examples. For example, one or more operations may be omitted or implemented by a different configuration, the order of the operations may be changed, one or more operations may be performed simultaneously or in parallel, or one or more operations may be performed repeatedly multiple times.

Figure 10:
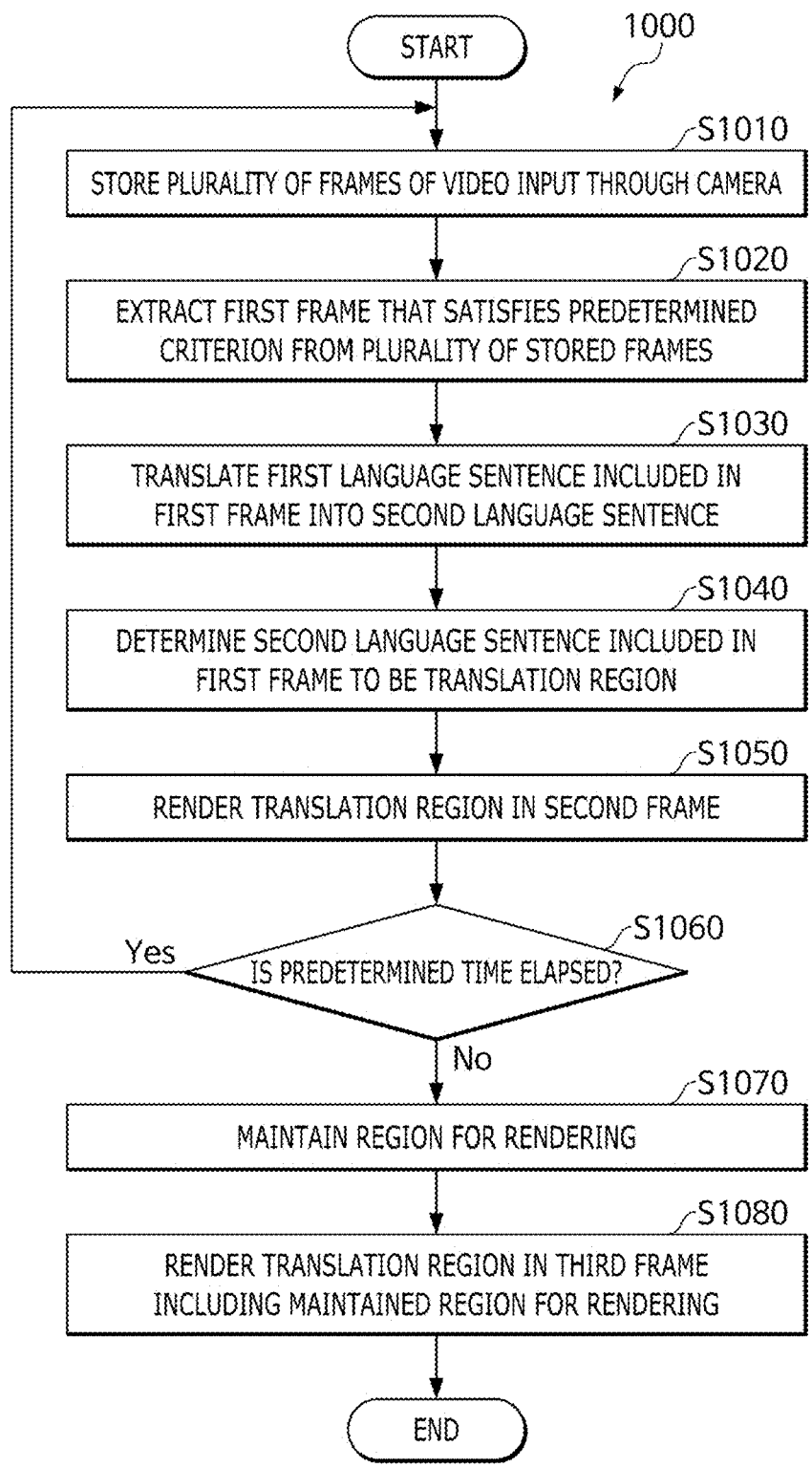
FIG. 10 is a flowchart illustrating a method for augmented reality-based image translation according to another example.

FIG. 10 is a flowchart illustrating an example of a method 1000 for augmented reality-based image translation. The method 1000 for augmented reality-based image translation may be performed by a processor (e.g., one or more processors of the information processing system or the user terminal).

As illustrated, the method 1000 may be initiated at S1010 by the processor storing in a buffer a plurality of frames representing a video captured by the camera. The processor may extract a first frame that satisfies a predetermined criterion from the plurality of stored frames, at S1020. The processor may translate the first language sentence (or group of words) included in the extracted first frame into the second language sentence (or group of words) at S1030, and determine a translation region including the second language sentence included in the first frame, at S1040. The processor may render the translation region in the second frame, at S1050.

The processor may determine a time interval between the first and second frames, and determine whether or not to maintain the region for rendering based on the determined time interval, at 51060. For example, if the time interval between the first and second frames is less than a predetermined criterion, it may be determined that the region for rendering is maintained, at S1070. The processor may render the translation region in the third frame including the maintained region for rendering, at 51080. The third frame may be one of a plurality of consecutive frames following the second frame. In other words, the third frame may refer to a frame representing at least a portion of the video captured by the camera at the time of rendering the translation region. On the other hand, if the time interval between the first and second frames is equal to or greater than the predetermined criterion, the processor may move to S1010 to re-execute the image translation cycle.

The flowchart illustrated in FIG. 10 and the above description are merely examples, and may be implemented differently in some other examples. For example, one or more operations may be omitted or implemented by a different configuration, the order of the operations may be changed, one or more operations may be performed simultaneously or in parallel, or one or more operations may be performed repeatedly multiple times.

Figure 11:
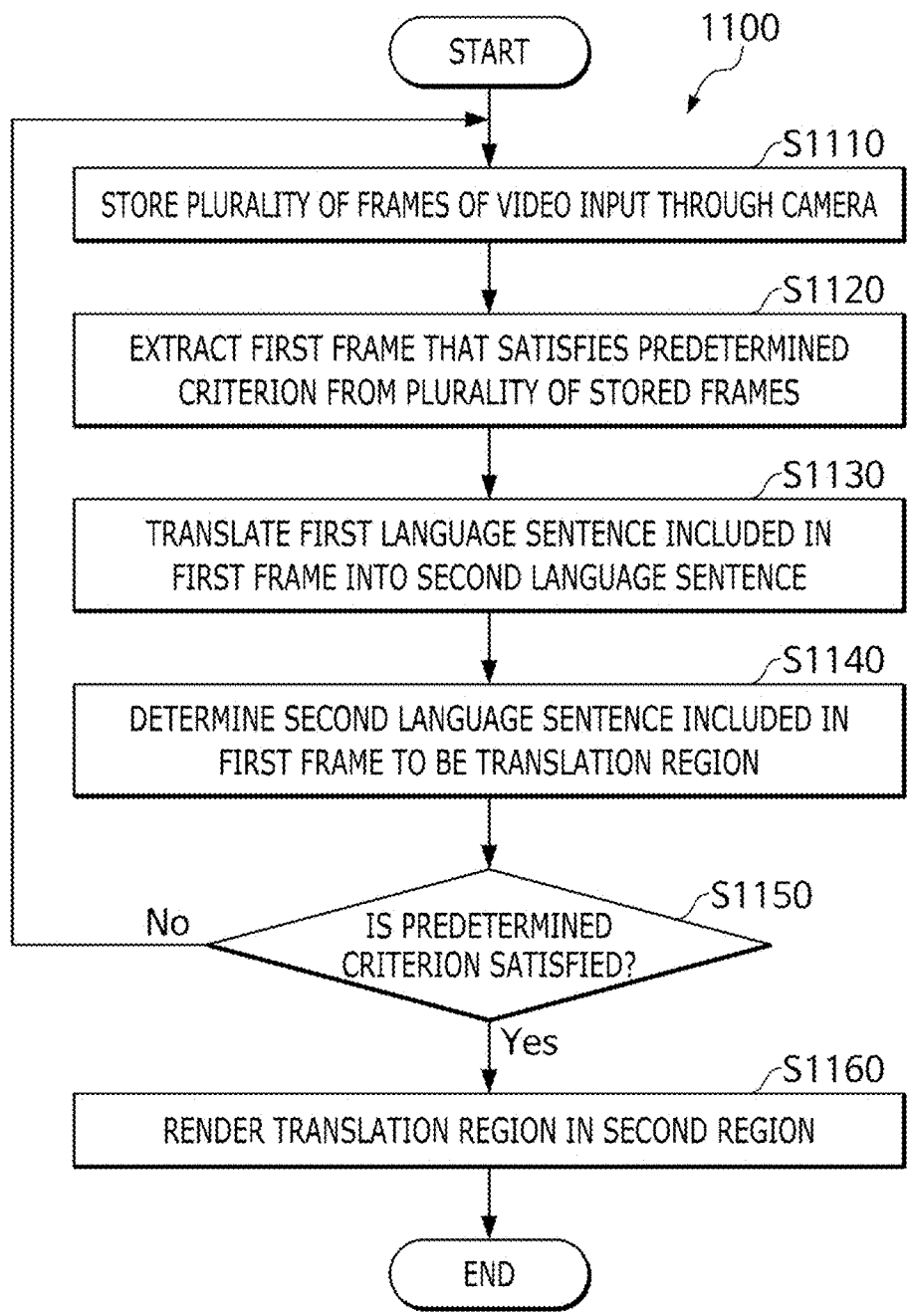
FIG. 11 is a flowchart illustrating a method for augmented reality-based image translation according to still another example.

FIG. 11 is a flowchart illustrating an example of a method 1100 for augmented reality-based image translation. The method 1100 for augmented reality-based image translation may be performed by a processor (e.g., one or more processors of the information processing system or the user terminal).

As illustrated, the method 1100 may be initiated at S1110 by the processor storing in a buffer a plurality of frames representing a video captured by the camera. The processor may extract a first frame that satisfies a predetermined criterion from the plurality of stored frames, at S1120. The processor may translate the first language sentence (or group of words) included in the extracted first frame into the second language sentence (or group of words), at S1130. An external device may be used for translating the first language sentence into the second language sentence. For example, the processor may transmit the first frame to the external device and receive from the external device the first frame including the second language sentence that is translated from the first language sentence included in the first frame. In addition, the processor may determine a translation region including the second language sentence included in the first frame, at S1140.

At S1150, the processor determines whether or not a predetermined criterion is satisfied between the first and second frames at S1150, and if the predetermined criterion is satisfied, the processor renders the translation region including the translated second language sentence in the second frame, at S1160. If the predetermined criteria are not satisfied, the processor does not render the translation region, and the process moves to S1110 to re-execute the image translation cycle. The predetermined criterion between the first and second frames may represent a time interval and/or a difference in motion between the first and second frames. For example, if the time interval between the first and second frames exceeds the predetermined time interval, the processor may perform a new translation cycle again without rendering the translation region. Additionally or alternatively, if the difference in motion between the first and second frames exceeds a predetermined difference, a new translation cycle may be performed again.

The flowchart illustrated in FIG. 11 and the above description are merely examples, and may be implemented differently in some other examples. For example, one or more operations may be omitted or implemented by a different configuration, the order of the operations may be changed, one or more operations may be performed simultaneously or in parallel, or one or more operations may be performed repeatedly multiple times.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, computers, electronic devices, other electronic units designed to perform the functions described in the present disclosure, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for augmented reality-based image translation, the method performed by one or more processors and comprising:
    storing a plurality of frames representing a video captured by a camera;
    extracting a first frame that satisfies a predetermined criterion from the stored plurality of frames;
    translating a first group of words included in the first frame into a second group of words;
    determining a translation region including the second group of words included in the first frame; and
    rendering the translation region in a second frame, and further wherein:
    the determining the translation region including the second group of words included in the first frame includes extracting features of the translation region, and
    the rendering the translation region in the second frame includes:
        determining, by using a feature transformation model, a region for rendering in the second frame based on the features of the translation region; and
        rendering the translation region in the region for rendering on the second frame,
    wherein the determining, by using the feature transformation model, the region for rendering in the second frame based on the features of the translation region includes:
    determining a time interval between the first and second frames; and determining a region for rendering in the second frame by using the feature transformation model including an algorithm determined based on the determined time interval, wherein the algorithm utilized is a first algorithm if the determined time interval is a first time interval and wherein the algorithm utilized is a second algorithm if the determined time interval is a second time interval, where the second time interval is shorter than the first time interval.

2. The method according to claim 1, wherein the feature transformation model includes a homography matrix that matches the translation region on the first frame to the region for rendering on the second frame.

3. The method according to claim 1, wherein the second frame is a frame representing at least a portion of the video captured by the camera at a time when the first group of words included in the first frame is translated into the second group of words.

4. The method according to claim 1, further comprising:
determining whether or not to maintain the region for rendering based on the determined time interval.

5. The method according to claim 4, further comprising:
maintaining the region for rendering, if the determined time interval is less than a predetermined criterion; and
rendering the translation region in a third frame including the maintained region for rendering.

6. The method according to claim 5, wherein the third frame is a frame representing at least a portion of the video captured by the camera at the time of rendering the translation region.

7. The method according to claim 1, wherein the predetermined criterion includes a predetermined brightness or a predetermined sharpness of the plurality of frames.

8. The method according to claim 1, wherein the predetermined criterion includes a predetermined number of characters included in the plurality of frames, a predetermined number of edges, or whether or not graphic processing is applied.

9. The method according to claim 1, wherein the translating the first group of words included in the first frame into the second group of words includes:
transmitting the first frame to an external device; and
receiving from the external device a first frame including the second group of words that is translated from the first group of words included in the first frame.

10. The method according to claim 1, wherein the rendering the translation region in the second frame includes rendering the translation region in the second frame, if a predetermined criterion between the first and second frames is satisfied.

11. The method according to claim 10, wherein the predetermined criterion between the first and second frames includes a predetermined time interval between the first and second frames.

12. The method according to claim 10, wherein the predetermined criterion between the first and second frames includes a predetermined difference in motion between the first and second frames.

13. A non-transitory computer-readable recording medium storing instructions that, when executed by one or more processors, cause performance of the method according to claim 1.

14. The method according to claim 1, wherein:
the first algorithm comprises a feature matching algorithm; and
the second algorithm comprises a feature tracking algorithm.

15. The method according to claim 1, wherein the first algorithm comprises a feature matching algorithm that includes:
extracting keypoints from the first and second groups of words and descriptors representing features around the first and second groups of words from the first and second frames, respectively;
calculating a similarity between all the keypoints and the features to perform matching;
estimating a transformation matrix between the matched keypoints or the features; and
using the estimated transformation matrix to warp the translation region of the first frame including the second language sentence into the region for rendering of the second frame.

16. The method according to claim 1, wherein the second algorithm comprises a feature tracking algorithm that includes:
extracting keypoints representing the first and second groups of words from the first and second frame, respectively; and
tracking a path the keypoints moved in the second frame using optical flow technology.

17. A system for augmented reality-based image translation, comprising:
a memory; and
one or more processors connected to the memory and configured to execute one or more computer-readable programs included in the memory, wherein:
the one or more programs include instructions for:
storing a plurality of frames representing a video captured by a camera;
extracting a first frame that satisfies a predetermined criterion from the stored plurality of frames;
translating a first group of words included in the first frame into a second group of words;
determining a translation region including the second group of words included in the first frame; and
rendering the translation region in a second frame, and further wherein:
the determining the translation region including the second group of words included in the first frame includes extracting features of the translation region, and
the rendering the translation region in the second frame includes:
determining, by using a feature transformation model, a region for rendering in the second frame based on the features of the translation region; and
rendering the translation region in the region for rendering on the second frame,
wherein the determining, by using the feature transformation model, the region for rendering in the second frame based on the features of the translation region includes:
determining a time interval between the first and second frames; and
determining a region for rendering in the second frame by using the feature transformation model including an algorithm determined based on the determined time interval, wherein the algorithm utilized is a first algorithm if the determined time interval is a first time interval and wherein the algorithm utilized is a second algorithm if the determined time interval is a second time interval, where the second time interval is shorter than the first time interval.

18. The system according to claim 17, wherein:
the first algorithm comprises a feature matching algorithm; and
the second algorithm comprises a feature tracking algorithm.

19. The system according to claim 17, wherein the first algorithm comprises a feature matching algorithm that includes:
extracting keypoints from the first and second groups of words and descriptors representing features around the first and second groups of words from the first and second frames, respectively;
calculating a similarity between all the keypoints and the features to perform matching;
estimating a transformation matrix between the matched keypoints or the features; and
using the estimated transformation matrix to warp the translation region of the first frame including the second language sentence into the region for rendering of the second frame.

20. The system according to claim 17, wherein the second algorithm comprises a feature tracking algorithm that includes:
extracting keypoints representing the first and second groups of words from the first and second frame, respectively; and
tracking a path the keypoints moved in the second frame using optical flow technology.

\* \* \* \* \*